United States Patent [19]

Silverman

[11] 3,861,007

[45] Jan. 21, 1975

[54] SWIVEL COUPLING DEVICE

[75] Inventor: I. Irving Silverman, Lincolnwood, Ill.

[73] Assignee: Runzel Cord & Wire Co., Chicago, Ill.

[22] Filed: Mar. 15, 1974

[21] Appl. No.: 451,459

[52] U.S. Cl. .............................................. 24/239
[51] Int. Cl. ........................................... A44b 13/02
[58] Field of Search ........... 24/73 R, 73 CE, 73 AC, 24/231, 241 R, 238, 239, 23 R

[56] References Cited
UNITED STATES PATENTS

| | | | |
|---|---|---|---|
| 2,826,798 | 3/1958 | Kahl et al. | 24/241 X |
| 2,986,788 | 6/1961 | Hasek | 24/73 CE |
| 3,212,153 | 10/1965 | Lynch | 24/238 |
| 3,365,759 | 1/1968 | Molzan et al. | 24/238 X |

FOREIGN PATENTS OR APPLICATIONS 677,224 8/1952 Great Britain ........................ 24/230

*Primary Examiner*—H. Hampton Hunter
*Attorney, Agent, or Firm*—Silverman & Cass

[57] ABSTRACT

A swivel coupling device for use in connecting at least one flexible member to an object or for connecting two flexible members together with provision for swivelling one relative to the other.

The device provides a central elongate body with a hook formation at one end and a swivel ring at the other end. A telescoping sleeve is slidable on the body between two limiting positions, in one of which a part of the sleeve cooperates with the hook formation to form a closed loop and in the other or second of which the hook formation is opened on a lateral side thereof.

A releasable lock or latch is provided to secure the sleeve and body in the one position, such lock being releasable by a simple manipulation. When released the sleeve may be slid relative to the body to "open" the hook formation. The construction of the lock is such that the simple maneuver of sliding the sleeve from the second position to the one position causes the latch to operate automatically to secure the sleeve in the said one position until manually released.

Means are provided to prevent turning of the sleeve and body relative to one another without hindering the sliding movement.

12 Claims, 7 Drawing Figures

PATENTED JAN 21 1975    3,861,007
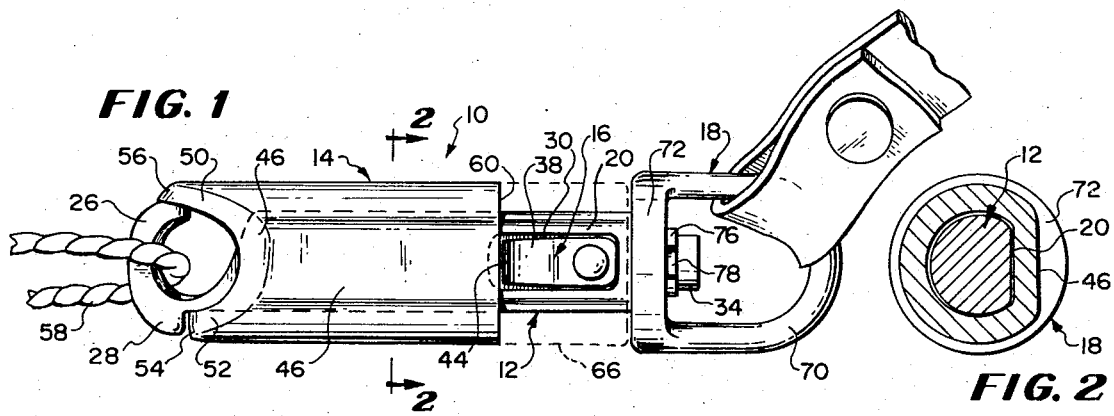
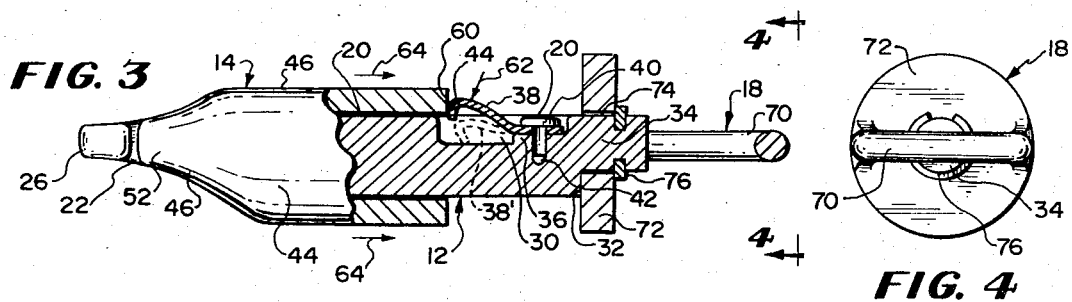
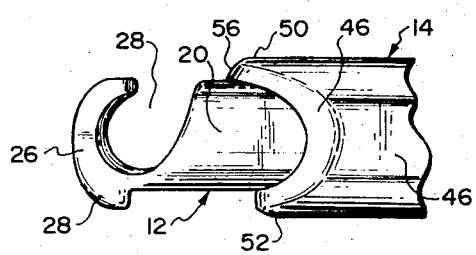
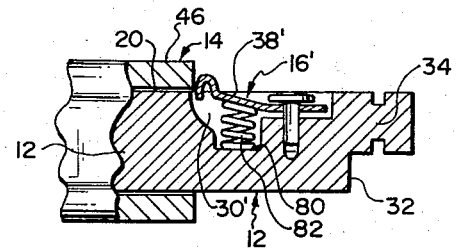
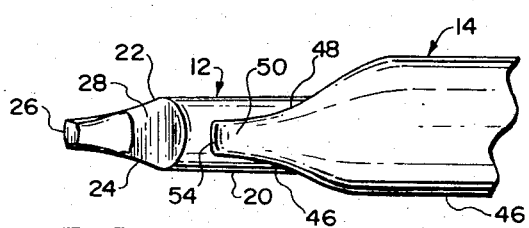

SWIVEL COUPLING DEVICE

BACKGROUND OF THE INVENTION

The subject matter of the invention is a coupling device which is required to swivel. Such devices are generally available in many forms for a variety of purposes. A common example is the use of such a coupling device on the end of a chain or leash to enable a person to couple the chair or leash to the ring of a dog collar. Some of the requirements of such a device are that it be robust and effective; that it be quickly unlocked by a simple manipulation; that it be capable of being quickly snapped into a locked position. Various other requirements are called for where these coupling devices are used in other environments. Thus, one could use such devices for securement of carrying straps to cameras or to camera cases; for connecting the straps, chains, cables or cords of portable radio equipment, weapons holsters, dispatch cases. In each case there are special needs which must be fulfilled by the coupling device.

The prior art in this subject matter is represented by patents which have issued over a long period of time from as far back as 1884 (U.S. Pat. No. 302,509) up to recent times. In addition to the patent mentioned, other patents serving as examples of the state of the art are U.S. Pat. Nos. 2,010,277 and 2,826,798.

The invention herein is directed to an aspect of this art which is concerned primarily with improving the efficiency of known coupling devices and perphaps even more important, making a coupling device which is economical to manufacture. The importance of this purpose is pointed up when one considers that the prior art devices are complicated and expensive to manufacture so that there is no incentive for a manufacturer to produce the same. He would have to charge inordinately high prices and thus decrease his market exposure. As a result, the using public is deprived of the alleged benefits represented by the prior art devices because they never reach the market.

One prior art device which has reached the market and has been sold in some small quantities is the structure of Kahl et al. U.S. Pat. No. 2,826,798 mentioned above. There are some slight variations from the structure disclosed, but the disadvantages can be discussed with reference to the patent.

Since there is required to be a specific orientation of the hook formation of the body of the Kahl et al. device with respect to a cooperating formation on the sleeve, the sleeve and body must be prevented from rotating relative to one another. In the Kahl et al. patent, there is a slot cut in the sleeve and a pin enters the slot and is engaged into the body. The expense of cutting the side wall of the sleeve and of driving the pin through the slot into the body after assembly, keeping proper alignment, etc. was apparently excessive because this structure is not used commercially. In the commercial device, a small radially inwardly extending lug is die cast integrally with the sleeve at the end opposite the cooperative formation and a cooperating open-ended axially extending groove is formed in the surface of the body part opposite the hook formation. When the device is assembled, the sleeve must be fitted over the body, slid into place with the lug engaging in the open end of the groove after which the swivel ring or bail is connected to the end of the body to provide stop means to prevent the sleeve from sliding back off the body.

Die casting is the simplest way of making the parts, but the dies needed to make lug and slot of the commercial Kahl et al. device are complex and expensive. Further, the small lug could well provide an area that does not cast well since it is on the end of the die and since it will become enlarged with flash as the die wears.

The Kahl et al. device illustrated in the patent has a complicated detent arrangement. The outer sleeve has opposite holes of unusual edge configuration and the inner body has spring pressed balls set into sockets, the balls being intended to push themselves into the holes and not come through while also preventing the sleeve from sliding back. Apparently, this wasn't successful either, because in the commercial Kahl et al. device, one of the holes in the sleeve is plugged and instead of a ball and spring there is a small plunger with a reduced diameter tip that positively fits into the hole. In both cases there are holes to be drilled or cast into the body, loose springs and balls or plungers to be manipulated to assemble the device.

According to the invention, neither the sleeve nor the body has any holes, grooves, slots or lugs therein. Thus, simple and economical dies can be used to make the same. The body has a small lateral chamber that is formed therein which is fully exposed during assembly and in which a locking latch or detent is installed. The forward sliding movement of the sleeve is stopped by a simple robust projection that is integral with the hook formation and not likely to be broken off as might be a small lug of the type used in the Kahl et al. commercial structure.

A novel structure is used to prevent rotation of the sleeve relative to the body without the need for grooves or lugs.

The invention has an important attribute in that it is ideally suited for its major parts to be die cast. In addition to this, there is no need for accuracy of alignment because of the absence of holes, grooves, lugs, etc. to interfit and closely cooperate in order to achieve proper operation. In a vernacularly expressed manner, the parts of the invention can be interfit sloppily without in any way affecting the efficient operation and durability thereof. This spells high speed and economical manufacture.

There are collateral advantages of the invention over the prior art which will be brought out in the detailed description thereof.

SUMMARY OF THE INVENTION

The swivel coupling device of the invention comprises a central elongate solid cylindrical body having an axially extending flat on at least one lateral side, a hook formation with a lateral stop projection at one end, the formation being tapered to provide a narrow dimension laterally so that the hook formation is relatively thin compared with the rest of the body. Adjacent its second end the body has a cavity or chamber into which a spring-pressed stop detent is to be installed, this chamber being formed into the flat surface. As seen, the stop detent is installed after assembly.

There is a telescoping sleeve which also has a conforming flat that enables the sleeve and body to slide axially relative to one another. The front end of the sleeve has a pair of opposed generally triangular projections which together provide a formation that cooperates with the hook formation to close the entrance to the hook and provide a relatively large loop when the sleeve is at its forward end of movement. This is called the one or first position and movement forwardly and beyond this position is prevented by the engagement of the stop projection on the hook formation.

The sleeve is slidable to the second position opposite the hook formation end of the body. At this end, the sleeve formation, which is simply an open end defining a plane normal to its axis, covers the chamber and stop detent. The stop detent must be manually pressed down into its cavity in order to permit this sliding movement to the second end since it is normally biased to move out of the cavity into the path of movement of the sleeve.

The axial end of the body has a simple post provided with an annular groove to receive a split ring. A swivel bail with an integral disc-like base having a central opening fits over the post and is held in place by the split ring which is installed into the annular groove thereafter. The disc-like base when in place prevents the sleeve from sliding off the back end of the body.

BRIEF DESCRIPTION OF THE DRAWING

FIG. 1 is a side elevational view of a swivel coupling device constructed in accordance with the invention, the same being shown in its closed loop forming condition with the sleeve locked into its forward or first position;

FIG. 2 is a sectional view taken through the swivel coupling device along the line 2—2 of FIG. 1 and in the indicated position;

FIG. 3 is a partial sectional and partial plan view taken generally looking up from the bottom of FIG. 1 but with the sectional portion generally taken along the medial axis of the swivel coupling device;

FIG. 4 is an end elevational view taken generally from the right hand end of FIG. 3 looking in the direction indicated by the arrows 4—4;

FIG. 5 is a fragmentary side elevational view of the left hand end of the swivel coupling device as viewed in FIG. 1 but with the sleeve moved to its second or hook opening position to enable the hook formation to be coupled to some connecting device such as a ring or other loop structure;

FIG. 6 is a fragmentary top plan view of the swivel coupling device in the condition of FIG. 5; and FIG. 7 is a fragmentary sectional view taken through the swivel coupling device in the same condition as shown in FIG. 3 but with a modified form of spring pressed stop detent and with the swivel bail not installed.

DESCRIPTION OF THE PREFERRED EMBODIMENT

The swivel coupling device as described in detail herein is embodied in only one example with a modification of the spring pressed stop detent, but variations are capable of being made readily.

The swivel coupling device is designated generally by the reference character 10 and as seen it comprises a small number of parts. These parts generally are the central elongate body 12, the telescoping sleeve 14, the spring pressed stop detent 16 and the swivel bail 18. The body 12, sleeve 14 and bail 18 are each unitary structures, but the detent 16 may comprise two small parts as shown in FIG. 3 or three small parts as shown in FIG. 7. The only other independent part not mentioned is the split ring that holds the bail 18 onto the body 12.

With respect to the details of the configuration and construction of the parts, it will be seen that the body 12, sleeve 14 and bail 18 are simple and can readily be die cast from suitable metal such as white metal, aluminum alloys, etc. These structures or some of them could even be made from synthetic resins since their structure is so simple.

The body 12 comprises a cylindrical member that is solid throughout its center portion and has a flat surface 20 along one lateral side and extending its entire length. At its front end, the body 12 tapers at 22 and 24 as shown best in FIGS. 3 and 6, terminating in a hook formation 26 whose entrance 28 is lateral. The entrance is on top as viewed in FIGS. 1 and 5. Note that the tapered configurations 22 and 24 are somewhat different because the taper 24 extends from the flat surface 20 while the taper 22 extends from the arcuate cylindrical surface of the remainder of the body 12. The hook formation 26 includes a large integral stop projection 28 that extends substantially further radially outwardly from the body 12 than the outermost surface of the cylindrical formation.

At its right hand end as viewed in FIGS. 1 and 3, the body 12 has a chamber 30 formed therein. The flat 20 of the cylindrical configuration terminates at 32 at which point there is a reduced diameter central cylindrical post 34 thus giving rise to a shoulder at 32. The chamber 30 preferably is axially spaced slightly from the shoulder 32. There is a shallow part of the chamber 30 produced by the presence of a slight pedestal 36 and a resilient leaf spring 38 is mounted to the pedestal 36 by a pin 40 driven through a perforation provided in the end of the spring 38 and into the pedestal 36. A suitable close fitting hole 42 is provided to receive the pin. The free end 44 of the spring 42 is arranged normally to protrude from the chamber 30 but it is capable of being engaged by a finger and pressed down into the chamber 30 so that the entire spring 38 and the pin 40 are below the plane of the flat 20.

The spring 38, pin 40, chamber 30 and pedestal 36 comprise the detent 16 mentioned above. Note that the entire detent 16 is confined to the flat 20 making it easy to assemble. As a matter of fact, the assembly of the spring pressed stop detent can take place before the sleeve 14 and bail 18 are assembled onto the body 12.

The sleeve 14 telescopes onto the body 12. Its configuration is cylindrical as at 44 round most of its surface but has a flat portion 46 along its length which is of such configuration and dimension as to have its interior surface conform exactly to the outer surface of the body 12. Notwithstanding such conformation, the construction of the device 10 is such that the clearance between the body 12 and the sleeve 14 can be generous so that the parts may freely slide relative to one another while any relative rotation is prevented.

The front end of the sleeve 14 is tapered at 46 and 48 in a generally narrowing formation to provide forwardly projecting triangular formations 50 and 52. These tapers and projections can be visualized as resulting from slicing away opposite sides of the sleeves 14 at the end thereof in an arcuate cut to provide the two formations or projections 50 and 52.

Again, because of the flat portion 46 on one side of the sleeve, the tapered surfaces 46 and 48 will not be symmetrical. In addition, the lower triangular projection 52 is shortened axially compared to the projection 50 so that the sleeve 14 may move well onto the hook formation 26 before the relatively blunt free end 54 of the projection 52 comes into engagement with the stop projection 28. When this occurs, the free end 56 of the projection 50 has moved to a position as shown in FIG. 1 in which it engages upon the upper end of the hook formation 26 and has thus closed off the entrance 28. This will confine any member that may have been engaged in the hook formation 26 as for example, the loop of a cable shown at 58.

The right hand end 60 of the sleeve 14 is plain, being the simple axial face thereof lying in a plane normal to the axis of the sleeve. The sleeve itself has no holes, slots, or projections interior or exterior and is easy to fabricate. Ideally it can be die cast.

The sleeve 14 is adapted to ride over the detent 16 but is prevented from moving axially to the right as viewed in FIGS. 1 and 2 by the protrusion of the leaf spring 38 bringing its free end 44 into engagement with the end 60 of the sleeve 14. To release the detent 16 the spring 38 is pressed inwardly by the thumb or other finger of the user applying force in a direction indicated by the arrow 62. The leaf spring 38 is then moved into the chamber 30 as indicated by the broken line formation 38' and the sleeve 14 can then be moved in the direction indicated by the arrows 64 to cover the detent 16. This movement will carry the sleeve to the right to the position indicated by the broken lines 66 in FIG. 1. The appearance of the left hand end of the device 10 under these conditions, with the sleeve in its second position and the hook "open" is shown in FIGS. 5 and 6.

The detent 16 has been called a spring-pressed stop detent because it is not operative in both directions. When the sleeve 14 is disposed in its second position covering the detent 16, said sleeve 14 is free to be moved to its first position at the front of the device 10. The moment the sleeve 14 reaches the first position, the spring 38 will snap out of the chamber 30 and assume the position shown in the solid lines of FIG. 3 with its free end 44 blocking return movement of the sleeve 14. Thus, in this position, the sleeve is stopped or locked in its first position and prevented from reverse movement. The detent 16 must be manipulated to permit the entrance 28 to the hook formation 26 to be opened.

The swivel bail 18 is a relatively simple structure comprising a U-shaped handle or loop 70 generally lying in the plane of the axis of the device 10 and integrally joined to a relatively flat disc-like base 72. The base is arranged parallel with the end 60 of the sleeve 14 and when assemmbled to the body 12 will serve as a stop to prevent the sleeve from coming off the body. Thus, the outer diameter of the base 72 is greater than that of the sleeve 14. The base 72 has a central opening 74 that engages upon the post 34 so that the base can be seated against the shoulder 32 and a split ring 76 installed in a suitable annular groove 78 formed in the post 34.

Again, the opening 74 can be somewhat larger than the post 34 and the groove 78 spaced from the shoulder 32 an axial distance generously greater than the thickness of the base 72 so that the bail 18 can freely swivel during the use of the device 10.

The slightly modified form of detent 16' shown in FIG. 7 has a somewhat different form of chamber 30' which provides a seat 80 for a helical spring 82 that in turn presses on the bottom of the leaf spring 38'. In other respects the structure and functions are the same as those of the detent 16.

While under normal circumstances appearance, finish and the absence of sharp corners or projections is a matter of design, the construction of the invention is such that these features are more readily obtained than in other structures. The tapers and formations enable the front ends of the respective body 12 and sleeve 14 closely to conform so that there are no projections that are exposed to catch on clothing or other apparatus. Also, in the event that the parts are to be plated, there are no precise dimensions to be maintained, no fine lugs or corners that must be kept sharp and no holes or slots which have to be considered.

Many variations suggest themselves without departing from the spirit or scope of the invention as defined in the appended claims such as for example the details of construction of the bail 18. It could have the loop or handle 70 pivotally connected to the disc 72 without difficulty.

The novelty of the invention resides, as stated, in the simplicity of the structure which enables economical and speedy manufacture. The components which form the principal combinations that give rise to the advantages are the flattened conforming configurations on the sides of the body and sleeve which confine movement in a simple manner; the stop projection directly on the hook formation which limits forward movement of the sleeve on the body in a positive manner; the detent construction and advantageous location on the flat. Elimination of complexity in these and other parts of the device is considered important.

What it is desired to secure by Letters Patent of the United States is:

1. A swivel coupling device comprising:
A. a solid elongate body member whose cross sectional configuration is that of a circle with a flat chord whereby the body member is a generally elongate cylinder with an axially extending flat side, a hook formation integral with the body member and formed at one end thereof, the hook formation opening laterally,
B. a hollow sleeve member having an internal configuration substantially the same as that of the exterior configuration of the body member and being arranged for axial sliding only relative to the body member,
C. a stop projection integral with the body member at the said one end thereof and extending into the path of movement of the sleeve member, the sleeve member having an extension thereof adapted to close off the opening of the hook formation when the sleeve is in a first position at said first end of the body member and a portion of said sleeve is in axial engagement with said stop projection.
D. a swivel handle connected to the second end of the body member,
E. means to prevent axial sliding movement of the sleeve member beyond a second position at the second end of said body member and
F. stop detent means connected with said body member and acting while in a blocking condition to prevent the movement of the sleeve member from its first position but manually operable to unblocking condition to permit movement of the sleeve member from the first position to the second position, the stop detent means being arranged to enable movement of the sleeve member from the second to the first position without manipulation.

2. The swivel coupling device as claimed in claim 1 in which the hook formation is relatively narrow and the opening thereof is disposed at approximately 90° relative to the plane of the flat side.

3. The swivel coupling device as claimed in claim 1 in which the means to prevent axial sliding movement of the sleeve member beyond said second position comprises a disc like structure connected with the swivel handle.

4. The swivel coupling device as claimed in claim 1 in which the stop projection is a part of the hook formation and disposed oppositely the opening thereof.

5. The swivel coupling device as claimed in claim 1 in which the said extension and portion of said sleeve comprise a pair of oppositely disposed generally triangular projections formed by oppositely disposed angled cutaway portions of the end of said sleeve member adjacent the said first end of the body member.

6. The swivel coupling as claimed in claim 1 in which the stop detent means are disposed in the flat side of the body member.

7. The swivel coupling as claimed in claim 6 in which the stop detent means comprise a flat spring biased strip of metal connected at one end in a chamber formed below the plane of the flat side of the body member and having the second end of the strip free and protruding into the path of movement of the sleeve member but capable of being pushed into the chamber and out of the said path.

8. A swivel coupling device comprising:
A. an enlongate solid body of generally non-circular cross-sectional configuration having a flattened lateral side extending axially along the length thereof, a narrow integral hook formation at one end opening laterally and having a stop projection integral therewith on the lateral side opposite said opening, an outwardly biased stop detent disposed in the flattened side adjacent the second end of the body and including a blocking member that protrudes beyond the plane of the flattened side but is capable of being pressed manually inwardly fully to clear the plane of the flattened side,
B. an elongate sleeve of shorter in axial length than and having generally the same interior cross-sectional configuration as the exterior cross-sectional configuration of the body and telescopically engaged on the body for axial movement relative thereto without rotative relative movement, the forward end of the sleeve having a pair of generally narrow projections on opposite sides thereof, the sleeve being arranged to move between a first position at said one end of the body and a second position at the second end of the body, the narrow projections of said sleeve comprising one projection that closes off the lateral opening of the hook formation and another projection that axially engages the stop projection when the sleeve is in said first position, the narrow projections respectively giving access to said opening and moving away from said stop projection when the sleeve is moved to its second position, and
C. a swivel bail engaged to the second end of the body and having a part which limits axial movement of the sleeve to confine same to said second position thereof,
the sleeve adapted to be moved to its second position only if the protruding member of the detent is moved inward but being otherwise prevented from moving out of said first position.

9. The swivel coupling as claimed in claim 8 in which the non-circular cross-sectional configuration is generally cylindrical and the flattened side forms a chord of the cylinder.

10. The swivel coupling as claimed in claim 8 in which the detent comprises a chamber formed in the body below the plane of the flattened side, said blocking member comprises a metal strip mounted in the chamber at one end thereof and has its opposite end free to move and outwardly biased as aforesaid and capable of being pressed manually into said chamber.

11. The swivel coupling as claimed in claim 10 in which the bias is provided by virtue of the metal strip being formed of resilient spring metal.

12. The swivel coupling as claimed in claim 10 in which the bias is provided by virtue of a spring engaging the metal strip from within the chamber and forcing same outwardly.

* * * * *